(12) United States Patent
Leman

(10) Patent No.: US 9,278,397 B2
(45) Date of Patent: Mar. 8, 2016

(54) RECIPROCATING SAW WITH REINFORCED OFFSET SAW BLADE HOLDER

(71) Applicant: Jeremy Leman, Strawn, IL (US)

(72) Inventor: Jeremy Leman, Strawn, IL (US)

(*) Notice: Subject to any disclaimer, the term of this patent is extended or adjusted under 35 U.S.C. 154(b) by 356 days.

(21) Appl. No.: 13/724,000

(22) Filed: Dec. 21, 2012

(65) Prior Publication Data

US 2014/0173919 A1 Jun. 26, 2014

(51) Int. Cl.
*B23D 51/10* (2006.01)
*B23D 49/11* (2006.01)

(52) U.S. Cl.
CPC ............... *B23D 51/10* (2013.01); *B23D 49/11* (2013.01); *Y10T 83/9473* (2015.04)

(58) Field of Classification Search
CPC ........ B23D 51/08; B23D 51/10; B23D 49/00; B23D 49/10; B23D 49/105; B23D 49/11; Y10T 83/9473
USPC .................. 30/392–394, 312, 329, 334, 337; D8/64, 67, 69, 70
See application file for complete search history.

(56) References Cited

U.S. PATENT DOCUMENTS

| | | | | |
|---|---|---|---|---|
| 2,954,808 A * | 10/1960 | Sweeney et al. | ................ | 30/375 |
| 3,028,890 A | 4/1962 | Atkinson et al. | | |
| 3,585,719 A * | 6/1971 | Kivela | ........................... | 30/392 |
| 4,276,675 A * | 7/1981 | Pioch | .............................. | 16/426 |
| 4,553,306 A | 11/1985 | Mineck | | |
| 5,755,293 A * | 5/1998 | Bourke | .......................... | 173/29 |
| 6,550,147 B1 | 4/2003 | Fishlock et al. | | |
| 6,871,405 B2 | 3/2005 | Reale et al. | | |
| 7,562,457 B2 | 7/2009 | Prieto | | |
| 8,256,528 B2 | 9/2012 | Oesterle et al. | | |
| 2004/0068876 A1* | 4/2004 | Bigden et al. | .................. | 30/392 |
| 2004/0151558 A1* | 8/2004 | Klopper | ....................... | 411/403 |
| 2007/0209217 A1* | 9/2007 | Ritter et al. | ..................... | 30/392 |

* cited by examiner

*Primary Examiner* — Ned Landrum
*Assistant Examiner* — Evan MacFarlane
(74) *Attorney, Agent, or Firm* — Thomas Paulius; The Law Offices of Konrad Sherinian

(57) ABSTRACT

An improved offset saw blade mounting assembly for use on a reciprocating power saw tool includes a shim member that is used to fill a central slot of the tool drive shaft. The shim member fills the slot and serves to reinforce the drive shaft and thereby reduce the likelihood of the drive shaft failing. The shim member may be a separate piece, or formed as part of a separate tubular insert, or integrally formed with the mounting block of the offset mounting assembly. A finger guard is also provided that substantially closes off any opening which may occur between the mounting assembly and the power tool.

13 Claims, 7 Drawing Sheets

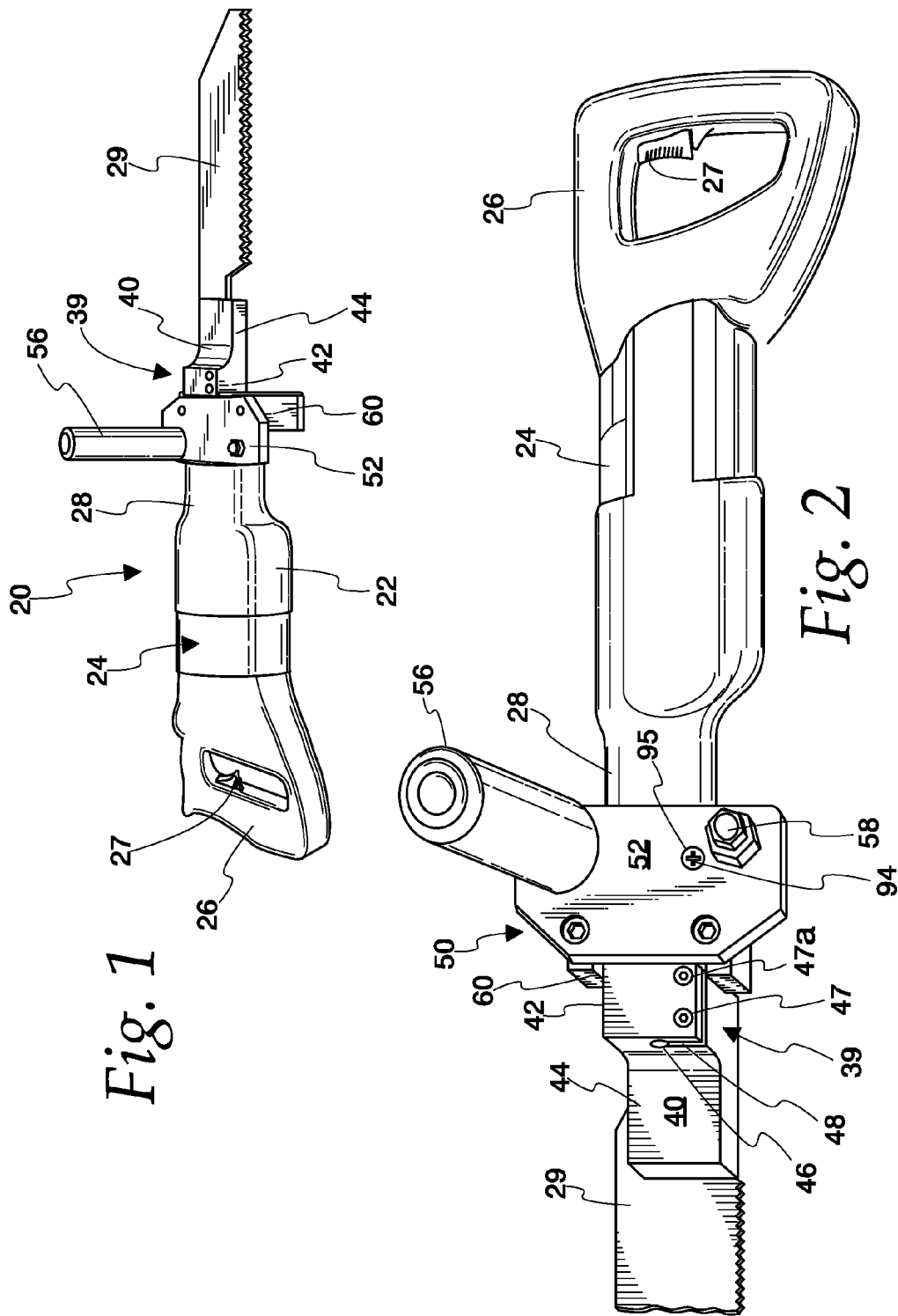

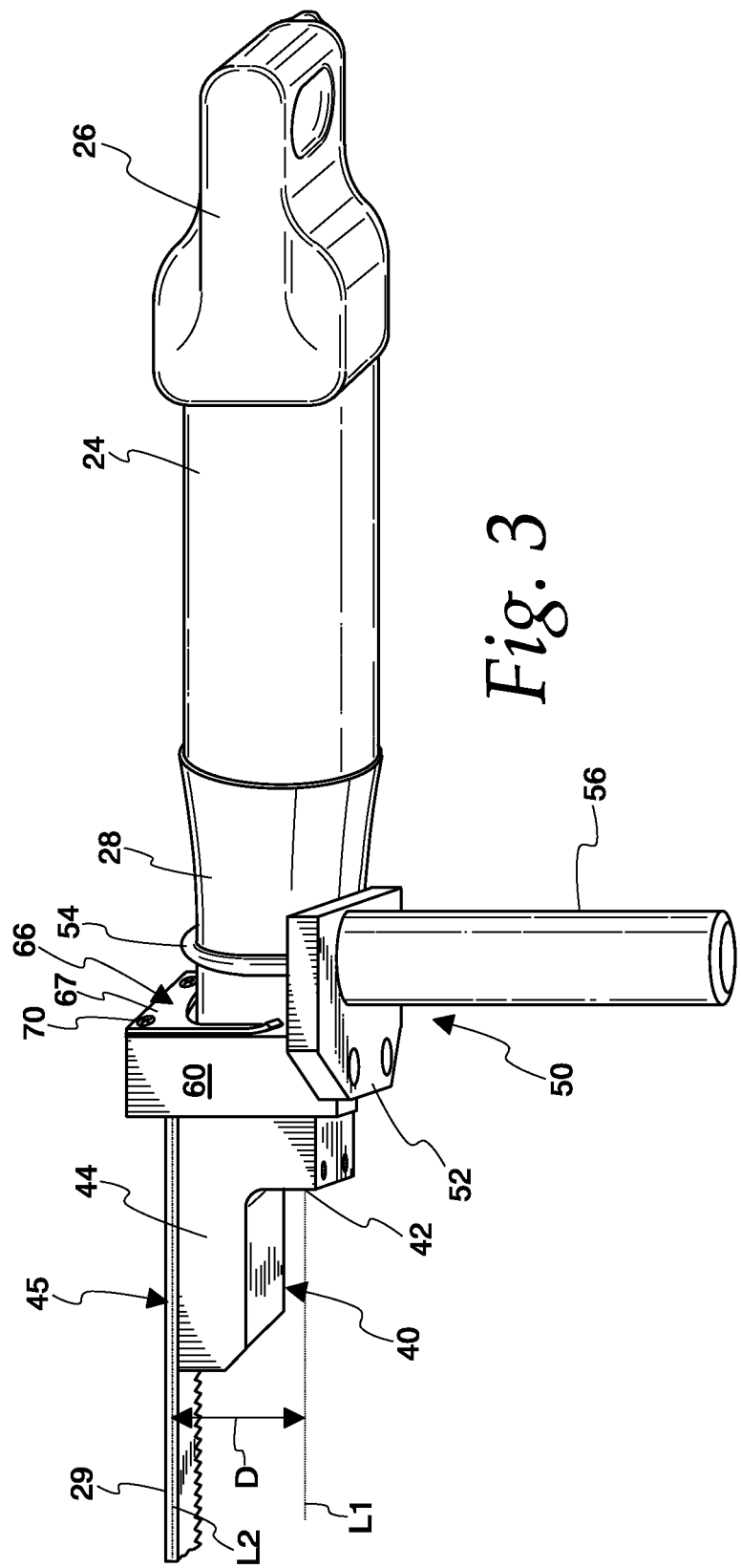

RECIPROCATING SAW WITH REINFORCED OFFSET SAW BLADE HOLDER

REFERENCE TO RELATED APPLICATIONS

No such reference is made at this time.

BACKGROUND OF THE DISCLOSURE

The present disclosure relates generally to reciprocating saw tools and more particularly, to an improved reciprocating saw with a reinforced saw blade holder that is mounted to a slotted drive shaft.

In the insulating foam industry, installers spray an insulating, expanding foam into selected building wall areas, such as those areas between adjacent studs of the building framing. The sprayed foam expands and sets and extends past the faces of the wall studs. This excess foam must be trimmed by the installer in order for interior and exterior sheathing and SHEETROCK® drywall or wall board to be applied to the framing. The foam is commonly trimmed by a hot wire that is pulled along the stud faces by an installer, or with a thin-bladed saw, such as a coping saw. Both of these methods are difficult to employ and both require substantial labor, reducing the potential profit for the installer. Installers now use reciprocating saws in order to trim the sprayed foam more quickly and more efficiently.

In order to make the process of using a reciprocating saw to remove excess foam more efficient, I developed a modification for an existing reciprocating saw that converts an ordinary reciprocating saw into one with an offset blade holder and a second, exterior handle. In this modification, I provided an offset mounting head that includes a mounting block with a hollow bore that receives therein, the free end of the saw tool drive shaft. The offset mounting head permits the installer to place the saw blade into closer contact with the faces of the framing studs to achieve a better trim of the insulating foam.

However, the free end of the drive shaft of the saw tool has a central slot that receives the attachment end of the saw blade, and the saw blade is secured to the shaft by means of a set screw or the like that extends through one of the drive shaft halves flanking the slot, into the drive shaft slot and into contact with an opposing surface of the saw blade. Although in my prior offset saw, the saw blade was no longer held in the drive shaft slot but mounted instead to a mounting block of the offset assembly, the drive shaft slot remained slotted as the replacement of it would make the resulting saw commercially unfeasible. The slotted drive shaft was used and the mounting block was slipped over the drive and a set screw was used to secure the mounting block to the drive shaft. The set screw extended through one of the drive shaft halves and into the slot.

This drive shaft slot creates a natural area in the drive shaft for stress risers to occur, i.e., areas of concentrated stress and this may result in one or both of the drive shaft halves deflecting under impact loading, or worse, breaking. Impact forces that occur when the end of the saw blade contacts a stud or sheathing during operation are transferred through the saw blade directly to the drive shaft to cause this stress. A need therefore exists for an offset saw blade mounting assembly used with a reciprocating saw in which the manner of mounting the saw blade is stronger and more resistant to stresses which may induce drive shaft failures.

The present disclosure is therefore directed to an improved offset saw blade mounting assembly for a reciprocating saw with a means for reinforcing the slotted drive shaft.

SUMMARY OF THE PRESENT DISCLOSURE

Accordingly, there is provided a power tool in the form of a reciprocating saw that is suitable for use with foam installation with a means for reinforcing the drive shaft.

In accordance with an embodiment as described in the following disclosure, an offset mounting block is provided for a reciprocating saw tool that utilizes a cylindrical, slotted drive shaft. The offset mounting block has a generally L-shaped configuration with distinct mounting block and a blade support portions that are spaced apart from each other. In the L-shaped offset mounting block of the preferred embodiment of the disclosure, a cylindrical bore is provided in the mounting block portion. This bore extends axially through the mounting block portion so that it may be slipped over a free end of the drive shaft. A pair of retaining screws clamp the mounting block to the drive shaft.

A guide channel assembly is also provided that guides the offset mounting block in its reciprocating movement and also is attached to the saw tool. The guide channel assembly includes a baseplate attached to the forward end of the saw body and extending out therefrom at an angle to the drive shaft. Two guide arms extend from the guide baseplate and cooperatively define a guide channel therebetween. The drive shaft and mounting block are disposed in this guide channel and the channel at least partially guides the mounting block in its reciprocating movement during operation of the saw. A handle member is attached to the baseplate on the side opposite the guide arms and extends out from the saw body at a right angle thereof so that the operator may grasp the saw at both its rear, conventional handle and at the forward end of the saw. The handle member is attached to the baseplate by way of a U-bolt, which also partially secures the guide channel assembly to the front barrel portion of the reciprocating saw tool. The baseplate is also preferably secured to the front barrel portion in a manner to prevent rotation, or other movement, of it about the front barrel portion.

In order to eliminate the possibility of one (or both) of the drive shaft halves bending or collapsing on the other in response to unexpected impact loading, my new development includes a shim member, or filler, that is provided to fill the drive shaft slot. Both of the drive shaft halves act like cantilevered beams when the slot is empty, and the drive shaft halves may bend or deflect a distance at least equal to the width of the slot. Impact forces on the saw blade may cause this deflection or bending. Inserting the shim member into the slot prevents the drive shaft halves from deflecting in a manner that could cause damage to the drive shaft. In the preferred embodiment of the present disclosure, the shim member is formed as a separate piece that is dimensioned to completely fill the slot, and this piece is inserted into the drive shaft slot. One or more set screws extend through part of the mounting block to securely clamp it to the drive shaft.

In another embodiment of the present disclosure, the mounting block includes a positioning slot formed in the mounting block, and which is aligned with the drive shaft slot so that an assembler may first place the mounting block onto the drive shaft, align the mounting block guide slot with the drive shaft slot and subsequently insert the shim member into the drive shaft slot by way of the mounting block guide slot. The guide slot assists in positioning the shim member in place within the drive shaft. In this regard, the shim member may be larger in dimensions than the drive shaft slot.

In yet another embodiment, the shim member may be formed as part of a separate insert, having a cylindrical, tubular body portion with a larger outer rim, or hub portion, and a shim portion integrally formed therewith and extending between walls of the tubular body portion. The mounting block bore is dimensioned so as to snugly receive the insert therein, and accordingly, a leading edge of the bore may be counterbored to accommodate the outer rim portion so that the insert fits flush with a face of the mounting block. In this manner, the drive shaft may be first roughly positioned in the mounting block bore and the insert then inserted into the bore onto the drive shaft. Thus, the insert fills the annular space between the inner wall of the bore and the exterior surface of the drive shaft.

Lastly, in yet another embodiment of the present disclosure, the shim member may also be formed as an integral part of the mounting block by a suitable method such as die-casting or electrodischarge machining (EDM) or the like so that when the mounting block is installed on the drive shaft, the shim member simultaneously is inserted into the drive shaft slot. Additionally, a finger guard may be provided for the entire offset mounting assembly, and supported by the guide channel guide arms in order to define a shield that at least partially encloses the opening that exists between the guide arms and the body of the saw. The shim member and the mounting block may be attached to an existing saw tool or may be utilized in the context of a kit of parts for converting an existing reciprocating saw into one with an offset blade holder.

These and other objects, features and advantages of the present disclosure will be clearly understood through a consideration of the following detailed description.

BRIEF DESCRIPTION OF THE DRAWINGS

The organization and manner of the structure and operation of the disclosure, together with further objects and advantages thereof, may best be understood by reference to the following detailed description, taken in connection with the accompanying Figures, wherein like reference numerals identify like elements, and in which:

FIG. 1 is a perspective view of a prior art, right-handed, reciprocating saw tool with a offset saw blade mounting assembly;

FIG. 2 is a slightly angled elevational view of a left-handed, reciprocating saw tool incorporating a reinforced saw blade holder constructed in accordance with the principles of the present disclosure;

FIG. 3 is a slightly angled top view of the known reciprocating saw tool of FIG. 1;

DETAILED DESCRIPTION OF THE DISCLOSURE

While the present disclosure may be susceptible to embodiment in different forms, there is shown in the Figures, and will be described herein in detail, specific embodiments, with the understanding that the disclosure is to be considered an exemplification of the principles of the present disclosure, and is not intended to limit the present disclosure to that as illustrated.

In the illustrated embodiments, directional representations—i.e., up, down, left, right, front, rear and the like, used for explaining the structure and movement of the various elements of the present disclosure, are relative. These representations are appropriate when the elements are in the position shown in the Figures. If the description of the position of the elements changes, however, it is assumed that these representations are to be changed accordingly.

Figure 5:
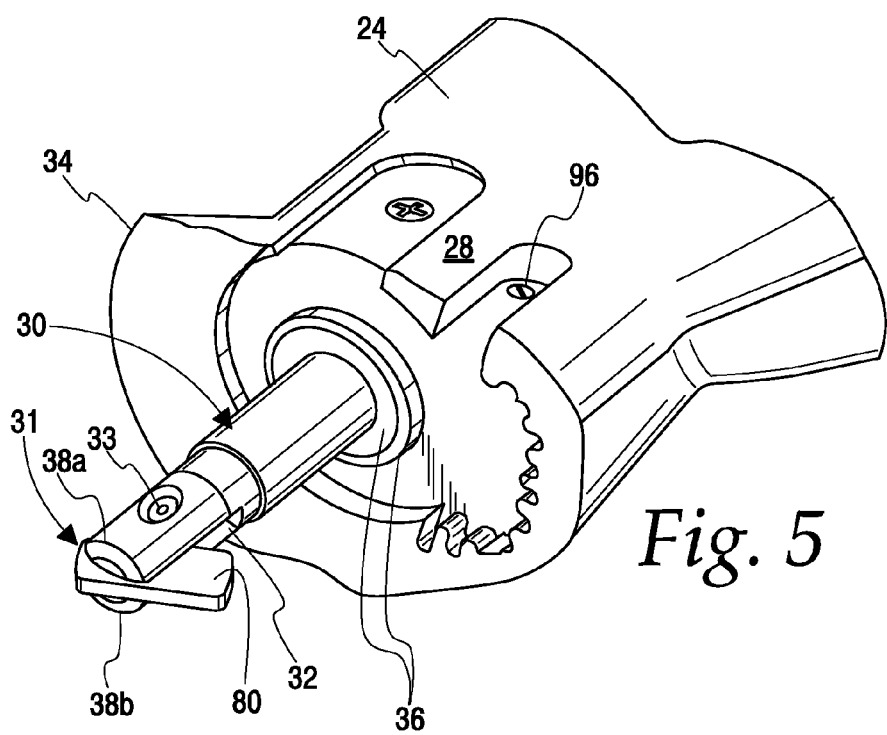
FIG. 5 is an enlarged detail view of the front end of the barrel portion of the reciprocating saw tool of FIG. 2, with the offset saw blade mounting assembly removed for clarity, and illustrating a first embodiment of a shim member partially in place within the drive shaft slot.

Turning now to FIG. 1, a power tool 20 is illustrated in the form of a reciprocating saw 22. The saw 22 has an elongated body 24 with a rear handle portion 26 that includes an operating switch 27 and a front barrel portion 28. A drive shaft 30 is disposed in the barrel portion 28 and supported therein for reciprocating motion along a first axis L1 that preferably is at the center of the drive shaft 30 so that a saw blade 29 attached to the drive shaft will operate in a back and forth cutting action. The drive shaft 30 (FIG. 5) is cylindrical in nature and has a free end 31 configured with a central slot 32 of a given length that is dimensioned to receive the butt end (not shown) of an elongated saw blade 29. As illustrated in FIG. 5, the drive shaft free end 31 extends past the front end of the tool barrel portion 28 and is supported therein for movement by a series of bearings 36. The drive shaft slot 32 divides the free end 31 of the drive shaft 30 into two halves, or shaft arms 38a,b and one of these two shaft arms 38a includes an opening 33 formed therein that is dimensioned to receive a retainer 35 that retains the saw blade 29 on a conventional saw tool. The retainer 35 typically takes the form of a fastener, such as a set screw.

In order to move the axis of the saw blade 29 to a second axis L2 that is spaced apart, or offset from, the first axis L1, an offset mounting assembly 40 is provided, which includes, among other elements, a mounting block 40. The mounting block 40 can be seen to have an L-shaped configuration defining two distinct portions, shown as a mounting portion 42 and a saw blade support portion 44, which, as illustrated in the FIGS, may be integrally formed together. The saw blade support portion 44 extends alongside the mounting portion 42 and serves to engage, such as by screws or the like, the mounting end 45 of a saw blade 29 along the second axis L2. The second axis L2 is spaced a predetermined distance D from the first axis L1. The mounting block 40 has a bore 46 formed in it that runs along the first axis L1 and which is dimensioned to receive the free end 31 of the drive shaft 30 therein. The mounting block 40 further includes a fitting slot 48 in alignment with the bore 46 and first axis L1, and which extends through the mounting block 40 to communicate with the bore 46. In order to provide a secure means of fastening the mounting block 40 to the drive shaft 30, a pair of holes 47 that accommodate clamping screws 47a are provided. These clamping screws 47a are tightened to an extent where the fitting slot 48 compresses and the mounting block thereby exerts a clamping force on the outside of the drive shaft 30.

Due to the offset nature of the mounting block 40, a guide assembly 50 is provided in order to guide the mounting block 40 in its reciprocating movement. This guide assembly 50 includes a baseplate 52 that extends in a plane parallel to the first axis L1 and is disposed proximate to the front end 34 of the saw front barrel portion 28. The guide baseplate 52 is secured to the saw body 24 by means of a U-bolt 54 that is joined at one end thereof to a cylindrical handle 56 and to fastening nuts 58 at the other end thereof. The U-bolt 54 is sized to extend around and contact the rubber boot that envelops the front end 34 of the saw front barrel portion 28 so as to secure the guide assembly 50 in place upon the saw tool. A pair of guide arms, or wings, 60 are mounted to the guide baseplate 52 such as by screws or bolts 62 and these guide arms 60 extend outwardly from the guide baseplate 52 for a length past the mounting area of the mounting block blade support portion 44 as well as the mounting end 45 of the saw blade 29. The guide arms 60 are separated by an intervening space 64 that forms a channel in which the mounting block 40 and drive shaft 30 move back and forth in their movement. The guide arms 60 have a predetermined width so as to close off the normally open area between the front end of the saw tool and the rear edge of the mounting block 40. The above structure and that illustrated in FIG. 1 defines my prior reciprocating saw development.

Figure 2A:
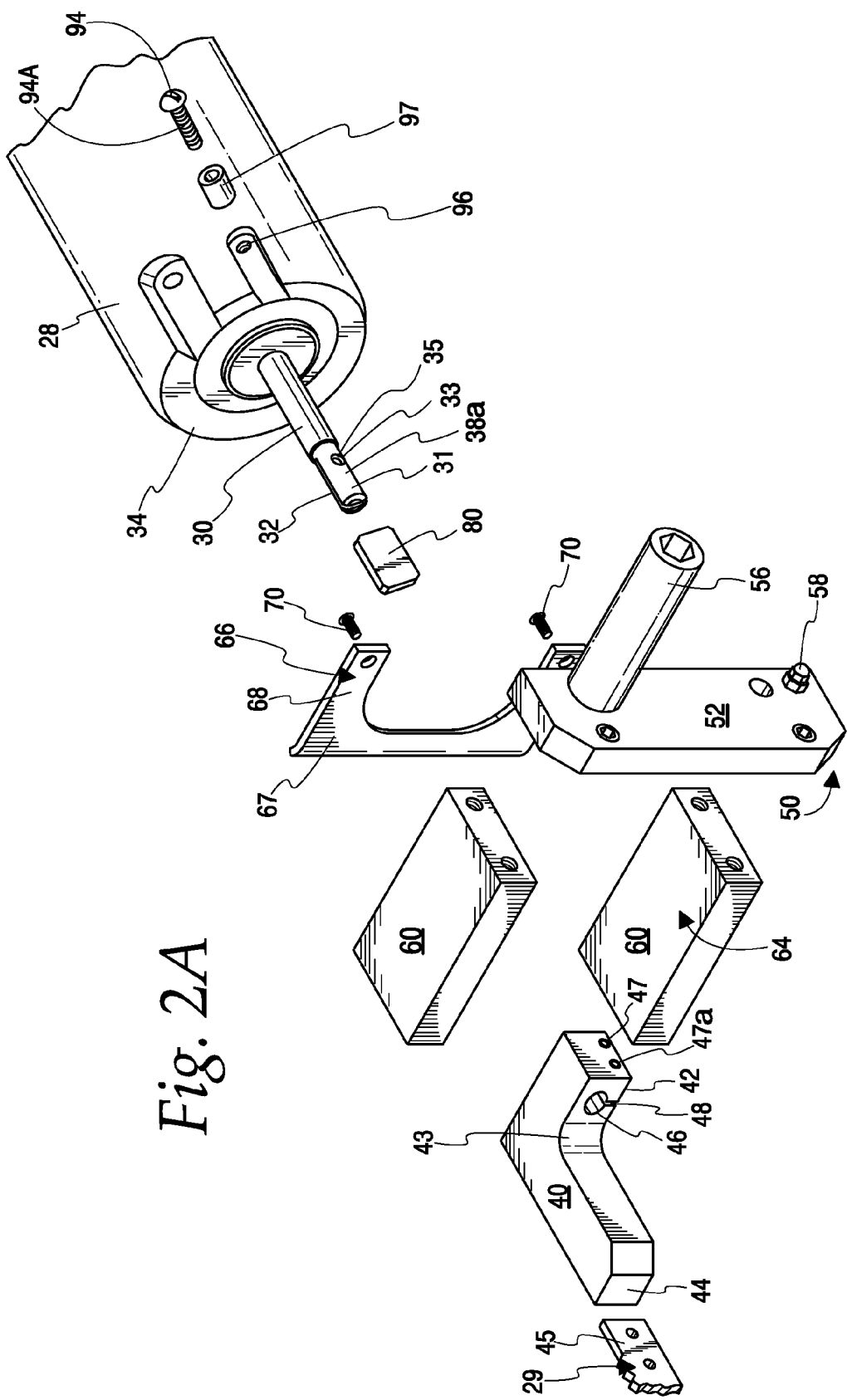
FIG. 2A is an exploded view of the offset saw blade mounting assembly of the reciprocating saw tool of FIG. 2.
Figure 4:
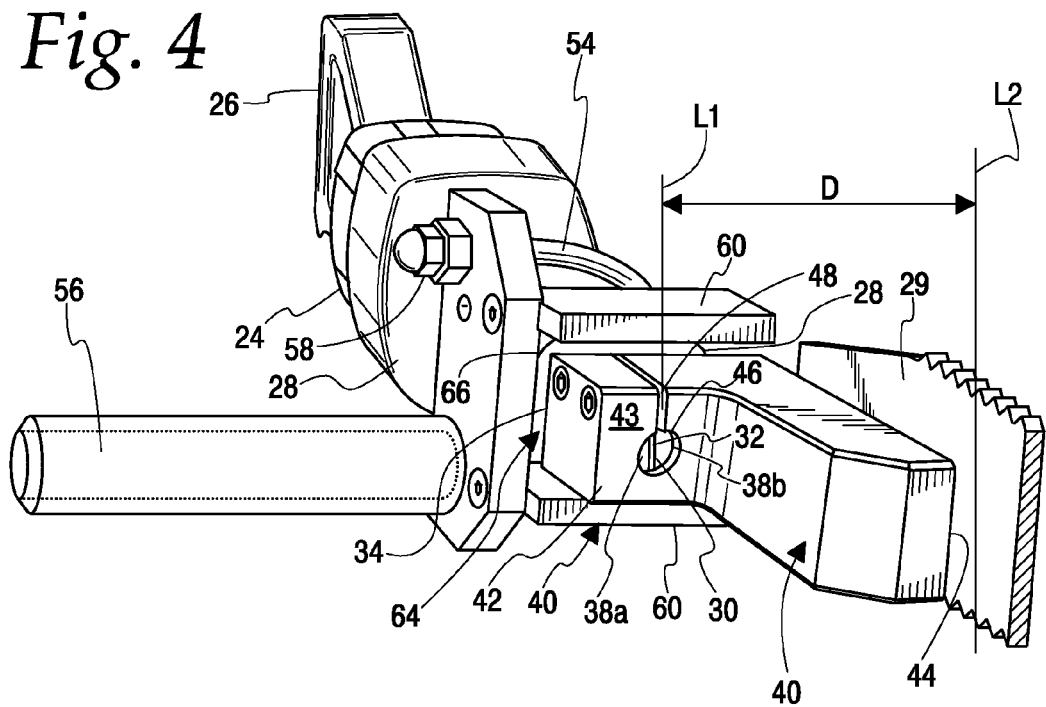
FIG. 4 is a perspective view of the reciprocating saw tool of FIG. 2, taken from the front end thereof and with the saw tool bottom side up.
Figure 7:
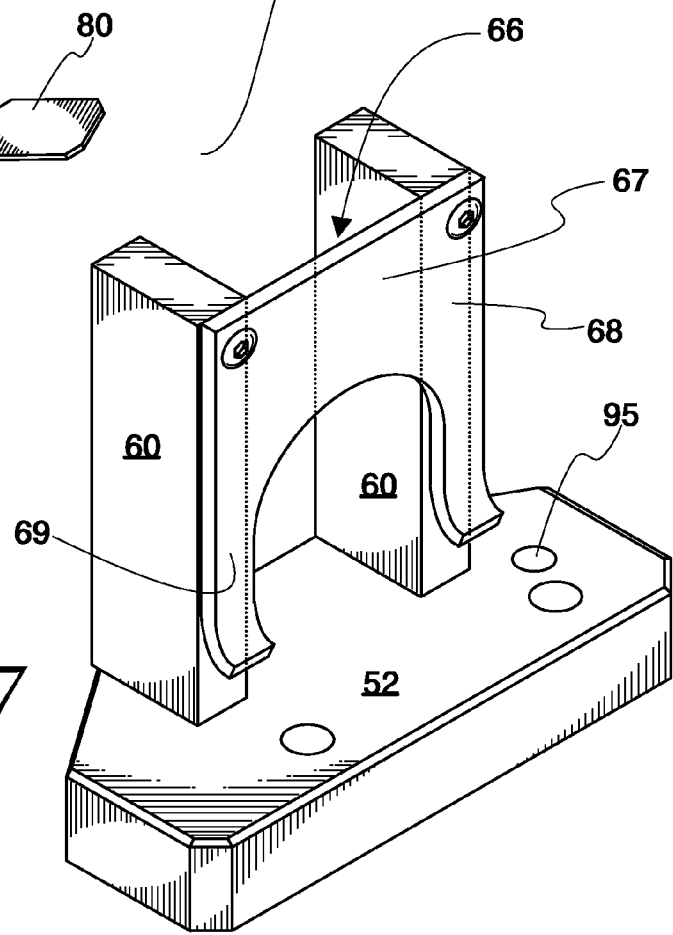
FIG. 7 is a perspective view of the guide channel member and a finger guard of the present disclosure attached thereto.
Figure 8:
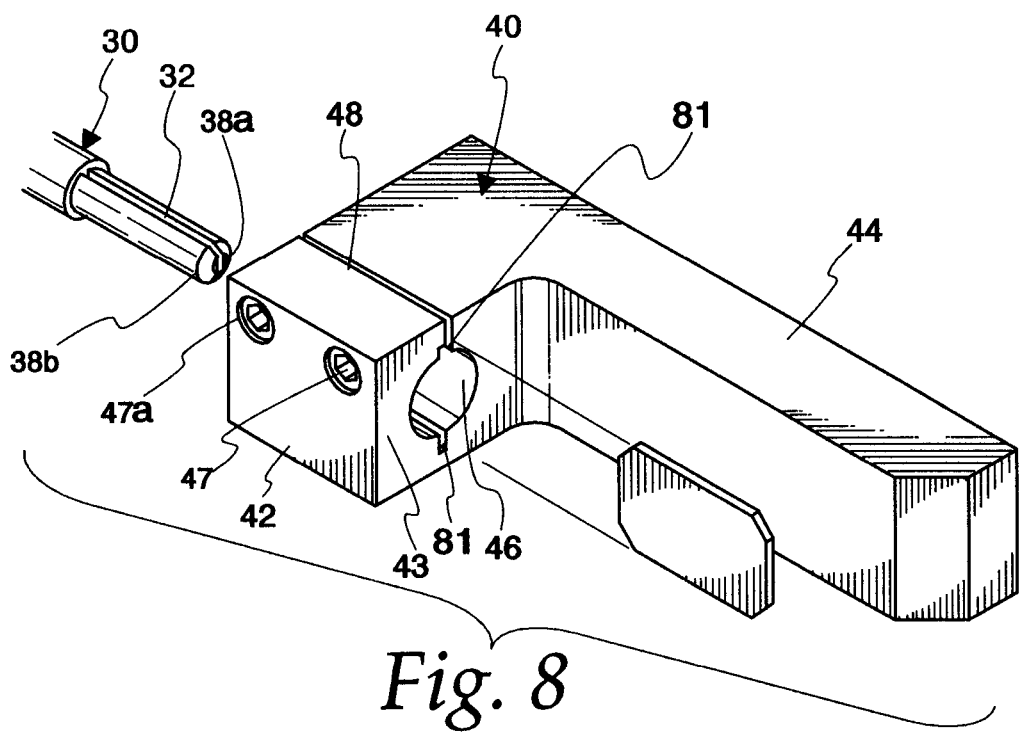
FIG. 8 is a perspective view of an alternate embodiment of an offset saw blade mourning block in accordance with the principles of the present disclosure utilizing a shim member inserted into the saw drive shaft slot and positioned therein by way of a guide slot in the mounting block.

In order to prevent the guide assembly 50 from rotating or otherwise moving about the front barrel portion 28 of the saw 22, during operation of the saw and the operator exerting a force on the handle 56, a mounting screw 94 is provided that extends through an opening 95 in the baseplate 52 and preferably into a tapped hole 96 in the front barrel portion 28 of the saw body 24. (FIG. 7.) In order to reinforce the mounting screw 94, a hollow collar, or sleeve 97, extends over the shaft 94a of the mounting screw and extends between and in contact with an interior surface of the baseplate 52 and the exterior surface of the front barrel portion 28. The sleeve increases the resistance of the mounting screw 94 to bending and other detrimental forces. Furthermore, in order to partially close off access to the moving drive shaft 30 and reduce the risk of a user getting his fingers, clothing or the like caught by the drive shaft 30 and front end of the tool during operation, I have now provided a guard plate 66. (FIGS. 4 & 8.) The guard plate 66 has an overall U-shaped configuration with a backbone portion 67 interconnecting two leg portions 68. The guard plate 66 may be secured to the guide assembly by screws 70 or the like such that the body portion 67 is disposed to the outside of the guide baseplate to provide necessary closure of this open area.

Figure 6:
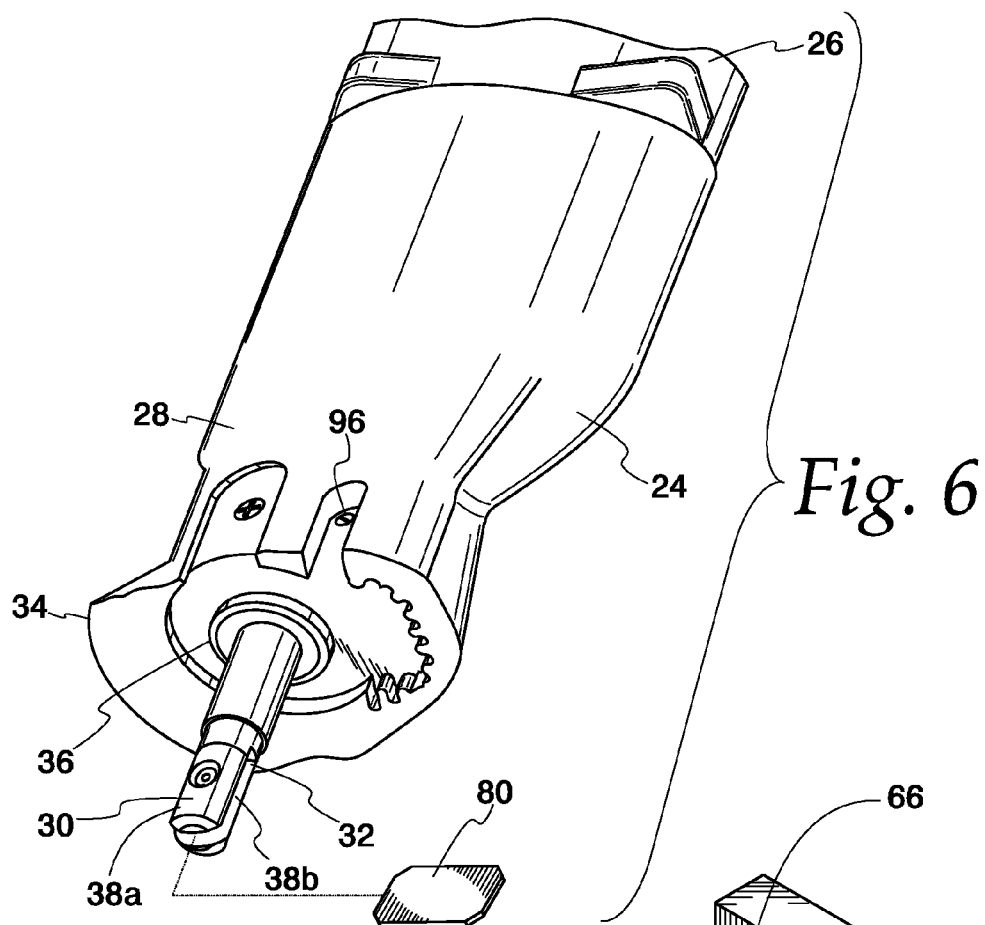
FIG. 6 is a view of the front end of a the reciprocating saw tool barrel portion and drive shaft and an shim member of the present disclosure intended for use therewith.

In use of my prior saw tools, it was discovered that even though the saw blade mounting end 45 was removed from the drive shaft slot 32, the drive shaft 30 was still subjected to possible stress concentrations and during repeated cycles of cutting, and the drive shaft arms/halves 30a, 30b could deflect, or crack, thereby weakening them. Once cracked, the mounting block lost complete reliable contact with the drive shaft 30 and the possibility of it coming loose from the drive shaft increased. In order to solve this problem, my new development utilizes a shim member 80, shown in FIGS. 5 & 6 as having a plate-shape, that is at least partially inserted into the drive shaft slot 32. Preferably, the shim member 80 has a thickness equivalent to the thickness of the drive shaft slot 32 and has a length equivalent to the slot length so that it completely fills the drive shaft slot 32. In use, the shim member 80 is inserted into the drive shaft slot 32 and the mounting block 40 is then applied to the drive shaft free end 31. The shim member 80 fills the slot 32, reinforces the drive shaft 30 and prevents either of the two shaft halves 38a, 38b from bending or otherwise deflecting during operation, thereby reducing the likelihood of imposition of increased stresses. In this embodiment, the shim member 80 is preferably inserted into the drive shaft slot 32 before applying the mounting block 40 onto the drive shaft 30.

FIG. 8 illustrates another embodiment of an improved power tool utilizing a shim member of the present invention. In this embodiment, the mounting block 40 is provided with a positioning slot 81 that is formed in the body of the mounting block and in communication with the mounting block bore 46. The positioning slot 81 is larger than the bore 46 and it permits the shim member 80 to be more easily inserted into the drive shaft slot 32 after the mounting block 40 has been attached to the drive shaft 30. In this embodiment, it is desired that the filling slot 48 be positioned off center of the bore 46, i.e. off of the first axis L1. In instances where the power saw has the drive shaft oriented in a horizontal direction, the positioning slot 81 will also be arranged horizontally.

Figure 9:
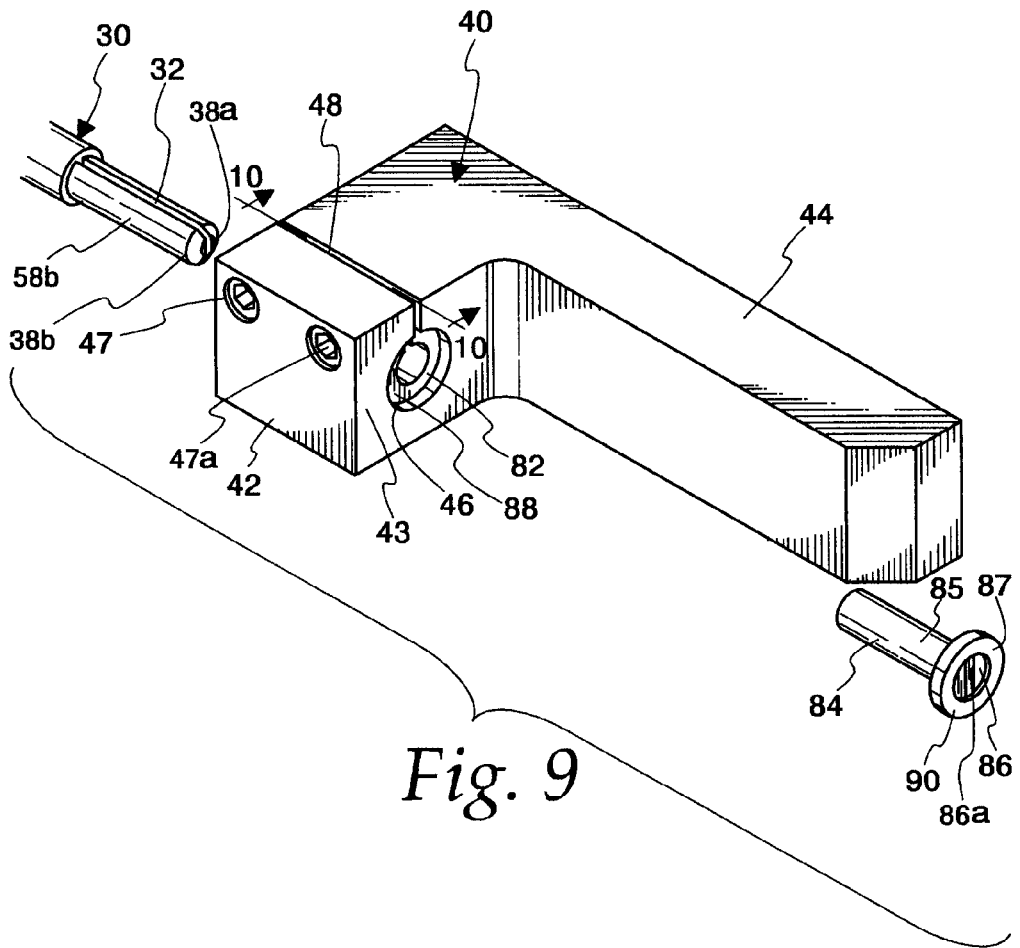
FIG. 9 is a perspective view of a third embodiment of an offset saw blade mounting block constructed in accordance with the principles of the present invention in which the shim member is incorporated into a cylindrical insert that is supported within a bore of the blade holder.
Figure 10:
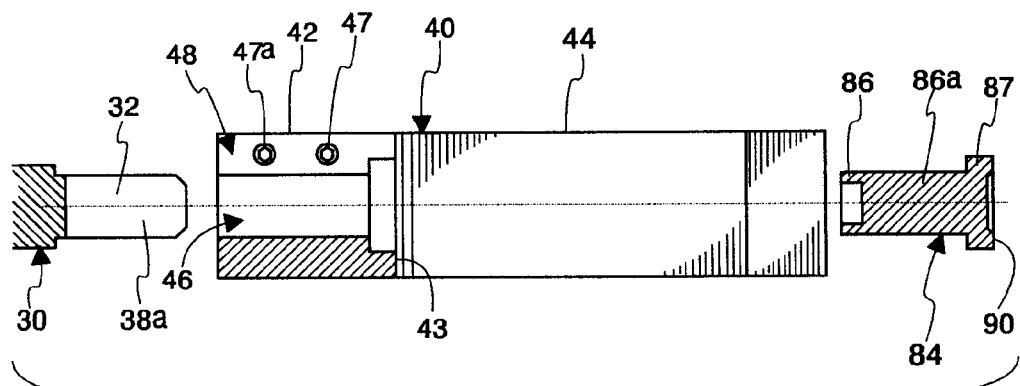
FIG. 10 is a sectional view of the saw blade mounting block of FIG. 9, taken along lines 10-10 thereof; and, FIG. 11 is a perspective view of a fourth embodiment of an offset saw blade mounting block constructed in accordance with the principles of the present invention which utilizes a shim member formed integrally as a single piece with the mounting block and extending within the bore thereof.

FIGS. 9 and 10 illustrate a third embodiment of the present disclosure in which the mounting block 40 has been modified with a counterbore 82 to receive an integrated, cylindrical insert 84 in the form of a tubular member 85 with a continuous sidewall 86 and a shim portion 86a formed integrally therewith and extending axially through the insert 84. The insert 84 may have a larger, outer shoulder or rim portion 87 that sits in the counterbore 82 and against an inner shoulder 88 thereof. The exposed, or front end, 90 of the insert preferably lies flush against the front face 43 of the mounting block mounting portion 42.

Figure 11:
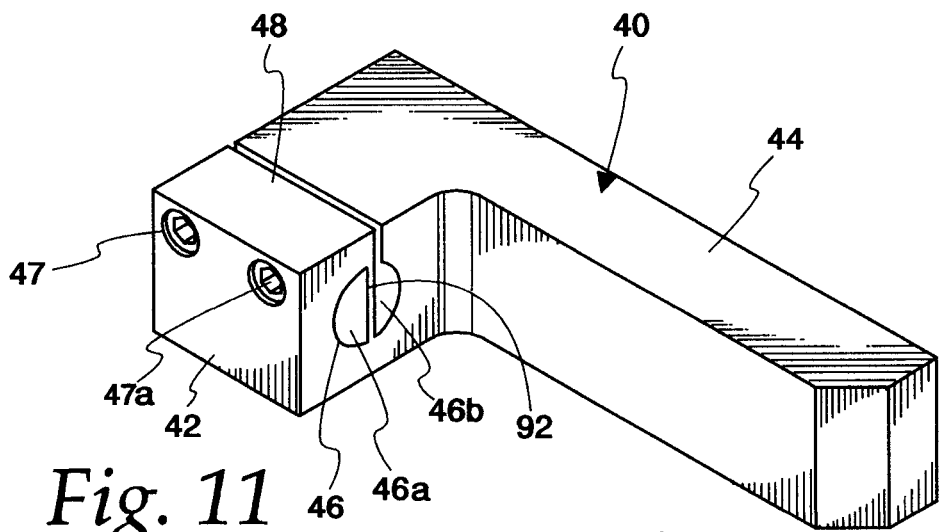
Figure 7A:
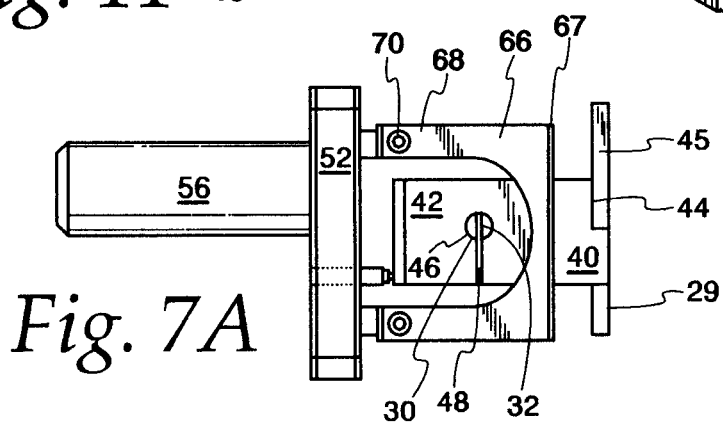
FIG. 7A is a rear elevational view of the offset mounting blade assembly in place upon the power saw.

Lastly, FIG. 11 illustrates yet another embodiment of the present disclosure where the shim member 92 is integrally formed with the mounting block 40 so that it divides the bore 46 into two distinct parts 46a, 46b. This is easily done for instances where the drive shaft slot 32 is oriented horizontally, but in vertical instance the bore filling slot 48 is made off center of the bore 46 so that the shim member 92 properly extends into the bore 46 without weakening the support for it. This type of mounting block may be formed by die-casting or EDM.

While preferred embodiments have been shown and described, it is envisioned that those skilled in the art may devise various modifications without departing from the spirit and scope of the foregoing Description and the appended Claims.

What is claimed is:

1. A reciprocating saw, comprising:
   a body, a drive shaft mounted within the body for reciprocating movement along a first axis, the drive shaft including a free end extending out of said body and past a front end portion thereof, the drive shaft free end including a slot extending axially rearwardly therein and defining two drive shaft halves separated by the slot,
   a saw blade mounting block, the mounting block having a body portion which fits over said drive shaft, the mounting block body portion including an axial bore that receives at least a portion of said drive shaft therein, said mounting block further including a saw blade support portion integrally formed with said mounting block body portion, the saw blade support portion supporting a saw blade along a second axis spaced apart from the first axis, said mounting block body portion further including a retainer for retaining said mounting block body portion in place over said drive shaft, and a plate-shaped shim member interposed in said drive shaft slot and disposed within said mounting block body portion axial bore, said shim member extending in and completely filling said drive shaft slot in order to reduce the likelihood of damage to said drive shaft during operation of said saw.

2. The reciprocating saw of claim 1, wherein said shim member is a single piece that is separate from said mounting block.

3. The reciprocating saw of claim 1, wherein said shim member is dimensioned to match like dimensions of said drive shaft slot.

4. The reciprocating saw of claim 1, wherein said mounting block further includes a guide slot disposed therein and communicating with said mounting block body portion axial bore, the guide slot at least partially receiving a portion of said shim member therein.

5. The reciprocating saw of claim 4, wherein said guide slot has a width that is greater than a corresponding width of said drive shaft.

6. The reciprocating saw of claim 1 wherein said guide assembly attached to the body front end portion, the guide assembly defining a guide channel in which said mounting block and said saw blade move in reciprocating movement in response to movement of said drive shaft.

7. The reciprocating saw of claim 6, wherein said guide assembly includes a baseplate and two spaced-apart guide arms disposed at angles to the baseplate, and extending outwardly from said baseplate and the guide arms cooperatively defining said guide channel, said guide arms having a width which extends over an area between said body front end portion and a rear edge of said mounting block, and said guide assembly further includes a rearwardly-facing guard plate at least partially closing off an area between said guide arms and said saw body to guard against the ingress of an operator's fingers or clothing therein during operation of said saw.

8. The reciprocating saw of claim 7, wherein the guard plate has a U-shaped configuration defining a guard plate backbone portion which is connected to two leg portions, the guard plate leg portions flanking said saw body, the guard plate backbone portion, said baseplate and said guide arms cooperatively extending entirely around said saw body front end portion.

9. The reciprocating saw of claim 7, wherein said baseplate is disposed along one side of said saw body front end portion, and said guide arms extend outwardly from one side of said baseplate across said saw body front end portion toward an opposite side of said saw body front end portion, and a handle extends outwardly away from an opposite side of said baseplate, said baseplate further including a fastener that extends between said baseplate and said body front end portion to resist movement of said guide assembly about said tool, the fastener including a reinforcing collar interposed between said baseplate and said fastener.

10. A reciprocating power saw with an offset saw blade holder with a reinforced saw blade mounting assembly, comprising:

the reciprocating saw including a front barrel portion, a rear handle portion and a body portion interconnecting the front barrel and rear handle portions together, the front barrel portion including a drive shaft supported therein for reciprocating movement, the drive shaft having a free end projecting past a front end of said front barrel portion, the drive shaft free end including an axial slot disposed therein, the drive shaft slot defining two opposing halves of the drive shaft free end, and said drive shaft slot being aligned with a first axis of said reciprocating saw;

a mounting assembly for mounting a saw blade to said reciprocating saw along a second axis thereof, offset from the first axis, the mounting assembly including a mounting block having a mounting portion for mounting to said drive shaft and a saw blade support portion supporting the saw blade thereon, the mounting portion including a bore for receiving said drive shaft free end therein and the bore being open along a front face of said mounting block, and a plate-shaped shim member disposed in said bore and within said drive shaft slot, the shim member completely filling said drive shaft slot to prevent said drive shaft halves from deflecting into said drive shaft slot during operation of said reciprocating saw;

a guide assembly for guiding said mounting block in reciprocating movement, the guide assembly including a guide baseplate disposed on one side of said front barrel portion and oriented transversely to said mounting block, said guide assembly further including a pair of guide arms, the guide arms extending away from the guide baseplate in a first direction and across part of said front barrel portion, said guide arms being separated by an intervening space in which said mounting block reciprocates in movement when said saw is operated, said guide arms further having a width that closes off an open area between the front end of said front barrel portion and a rear edge of said mounting block;

a handle disposed on a side of said baseplate opposite that of said guide arms and extending outwardly away from said front barrel portion in a second direction; and, said guide assembly further including a rearwardly facing guard member supported by said guide arms and extending transversely to said guide baseplate to prevent access to the open area between said front end of said front barrel portion and the rear edge of said mounting block, the guard member having a general U-shape with a backbone portion interconnecting two leg portions such that said guard member, two guide arms and baseplate cooperatively define a hollow passage through which said reciprocating saw front barrel portion extends.

11. The reciprocating saw of claim 10, wherein said guard member is disposed such that the guard member backbone portion is spaced apart from said front barrel portion and said guard member leg portions flank said front barrel portion, the guard member backbone extending between said guide assembly guide arms, and defining, in cooperation with said guide assembly guide arms and baseplate, the hollow passage that fits over said front barrel portion.

12. The reciprocating saw of claim 10, wherein said guide assembly includes a fastener that fastens said guide assembly to said front barrel portion in a manner that prevents rotation of said guide assembly about said front barrel portion, the fastener including a reinforcing collar.

13. A reciprocating saw, comprising:

a saw body, a drive shaft mounted within the saw body for reciprocating movement along a first axis, the drive shaft including a free end extending out of said saw body and past a front end portion thereof, the drive shaft free end including a slot extending axially rearwardly therein and defining two shaft halves separated by the slot, a saw blade mounting block, the mounting block having a body portion disposed over said drive shaft, the mounting block body portion including an axial bore configured to receive at least a portion of said drive shaft therein, said mounting block further including a saw blade support portion spaced apart from said mounting block body portion and configured to support a saw blade along a second axis spaced apart from the first axis, said mounting block body portion further including a retainer for retaining said mounting block in place on said drive shaft, and a guide assembly attached to said body front end portion, the guide assembly defining a guide channel which at least partially surrounds said mounting block, said guide assembly including a baseplate and two guide arms disposed at angles to the baseplate, said baseplate and the guide arms cooperatively defining said guide channel, and said guide assembly further including a rear-facing guard plate that interconnects said guide arms together to guard against the ingress of an operator's fingers or clothing therein during operation of said saw, wherein the guard plate has a U-shaped configuration defining a guard plate backbone portion connected to two leg portions, the leg portions flanking said saw body, the guard plate backbone portion, said baseplate and said guide arms being interconnected to cooperatively define a hollow passage through which a portion of said saw body extends.

* * * * *